United States Patent
Lindegger et al.

(10) Patent No.: US 8,030,802 B2
(45) Date of Patent: Oct. 4, 2011

(54) UNINTERRUPTIBLE POWER SUPPLY FOR A MEDICAL APPLIANCE

(75) Inventors: Stefan Lindegger, Huttwil (CH); Reto Sigrist, Golaten (CH)

(73) Assignee: Roche Diagnostics International AG, Steinhausen (CH)

( * ) Notice: Subject to any disclaimer, the term of this patent is extended or adjusted under 35 U.S.C. 154(b) by 185 days.

(21) Appl. No.: 12/423,423

(22) Filed: Apr. 14, 2009

(65) Prior Publication Data
US 2009/0230775 A1   Sep. 17, 2009

Related U.S. Application Data

(63) Continuation of application No. PCT/EP2007/009251, filed on Oct. 25, 2007.

(30) Foreign Application Priority Data
Oct. 25, 2006  (CH) .................... 1692/06

(51) Int. Cl.
  *H02J 7/00* (2006.01)
(52) U.S. Cl. .................................. 307/150
(58) Field of Classification Search ............... 307/150
See application file for complete search history.

(56) References Cited

U.S. PATENT DOCUMENTS

| | | | |
|---|---|---|---|
| 5,703,412 A | 12/1997 | Takemoto et al. | |
| 5,811,978 A | 9/1998 | Tsubone | |
| 5,995,891 A | 11/1999 | Ueda et al. | |
| 6,459,242 B1 | 10/2002 | Bures et al. | |
| 7,202,576 B1 * | 4/2007 | Dechene et al. | 307/66 |
| 2003/0083619 A1 | 5/2003 | Angel et al. | |
| 2003/0107906 A1 * | 6/2003 | Tokunaga et al. | 363/89 |
| 2008/0013224 A1 * | 1/2008 | Kim et al. | 361/16 |

FOREIGN PATENT DOCUMENTS

| | | |
|---|---|---|
| EP | 0168472 | 1/1986 |
| EP | 1646124 | 4/2006 |
| FR | 2845837 | 4/2004 |
| GB | 2395373 | 5/2004 |
| WO | 2004051823 | 6/2004 |
| WO | 2006006166 | 1/2006 |

OTHER PUBLICATIONS

International Search Report, dated Feb. 3, 2004.
International Search Report dated Jun. 3, 2008.

* cited by examiner

*Primary Examiner* — Robert L. Deberadinis
(74) *Attorney, Agent, or Firm* — Dinsmore & Shohl LLP

(57) ABSTRACT

An apparatus for metered supply of a liquid medicament having a power supply which not only allows the primary battery to be replaced without interrupting the insulin supply, but also makes it possible to bridge uncontrolled short-term interruptions in the current supply or voltage supply resulting from bouncing of the battery contacts, while also providing an adequate emergency power reserve is disclosed.

10 Claims, 4 Drawing Sheets

UNINTERRUPTIBLE POWER SUPPLY FOR A MEDICAL APPLIANCE

CROSS REFERENCE TO RELATED APPLICATIONS

This application is a continuation of PCT Application PCT/EP2007/009251, filed Oct. 25, 2007, which claims priority to Switzerland (CH) application Ser. No. 01692/06, filed Oct. 25, 2006.

FIELD OF THE INVENTION

The invention relates generally to an uninterruptible power supply for a medical appliance, and in particular a medical appliance with a replaceable energy source for emitting medical liquids.

BACKGROUND OF THE INVENTION

Electronic appliances are increasingly being used for self-medication in medical electronics, with these appliances generally being worn by the user directly on the body and supplying the medicament liquid continuously or quasi-continuously, as appropriate for the therapeutic requirement. By way of example, computer-controlled insulin pumps are being used for the treatment of diabetes mellitus, allowing the patient to be supplied with an insulin level which corresponds to the physiological characteristics of a non-diabetic, to a good approximation.

In order to allow the therapeutic end to be achieved, a series of fundamental requirements must be satisfied. Under all circumstances, it is necessary to avoid the power supply to the medical appliance failing without this failure being evident.

Since the apparatus is subject to considerable mechanical forces during normal daily use and its individual parts have different moments of inertia, it is possible in the event of a corresponding force influence, for example as a result of a sudden movement by the user, for the battery to be disconnected from the contact spring for a brief moment, causing a brief interruption in the voltage. Such inadvertent and possibly unnoticed resetting of the apparatus can have serious consequences for the supply of the product, and patient safety.

Furthermore, it will be desirable to bridge relatively long failures of the power supply which can occur, for example, during replacement of the batteries, in order to avoid the need for monitored and time-consuming resetting of the insulin pump to a rest state.

Power supplies for insulin pumps are known from the prior art which allow more far-reaching so-called power management. Patent document EP 0168 472 discloses a fluid pump apparatus with a supporting energy source whose object is to allow the first power source to be supplied with sufficient energy, although the insulin pump functionality is greatly restricted in this operating mode. Power management systems are likewise known from the prior art which, when the energy source is identified as having been exhausted, change to an operating mode in which the insulin pump is stopped. The insulin pump therapy cannot be continued until a new battery has been inserted and the insulin pump has been set to the operating mode again, by the user.

The time at which the energy sources will become discharged can be predicated only imprecisely owing to the various influences acting on the stored rated energy of the energy source, for example storage conditions, temperature, age of the battery. If the energy cells for a patient become discharged during the night, the patient must be woken up from his sleep by requesting him to change the batteries. Even during the normal course of the day, it is desirable to have a certain emergency power reserve available, for example if a new energy source is not immediately available to the pump wearer.

SUMMARY OF THE INVENTION

It is against the above background, that in one embodiment a power supply for a medical appliance having a first replaceable energy source (1) for supplying electrical energy, a second energy source (2) for bridging supply gaps from the first energy source (1), and a charging appliance (3) which is fed from the first energy source and ensures that the second energy source has an adequate state of charge, wherein the second energy source (2) comprises a high-capacity storage element, ensuring an uninterruptible power supply for the medical appliance if the first energy source fails is disclosed.

BRIEF DESCRIPTION OF THE DRAWINGS

Further preferred embodiments of the invention are specified in the dependent claims, and will become evident from the following description, which is based on the figures, in which:

DETAILED DESCRIPTION

Figure 1:
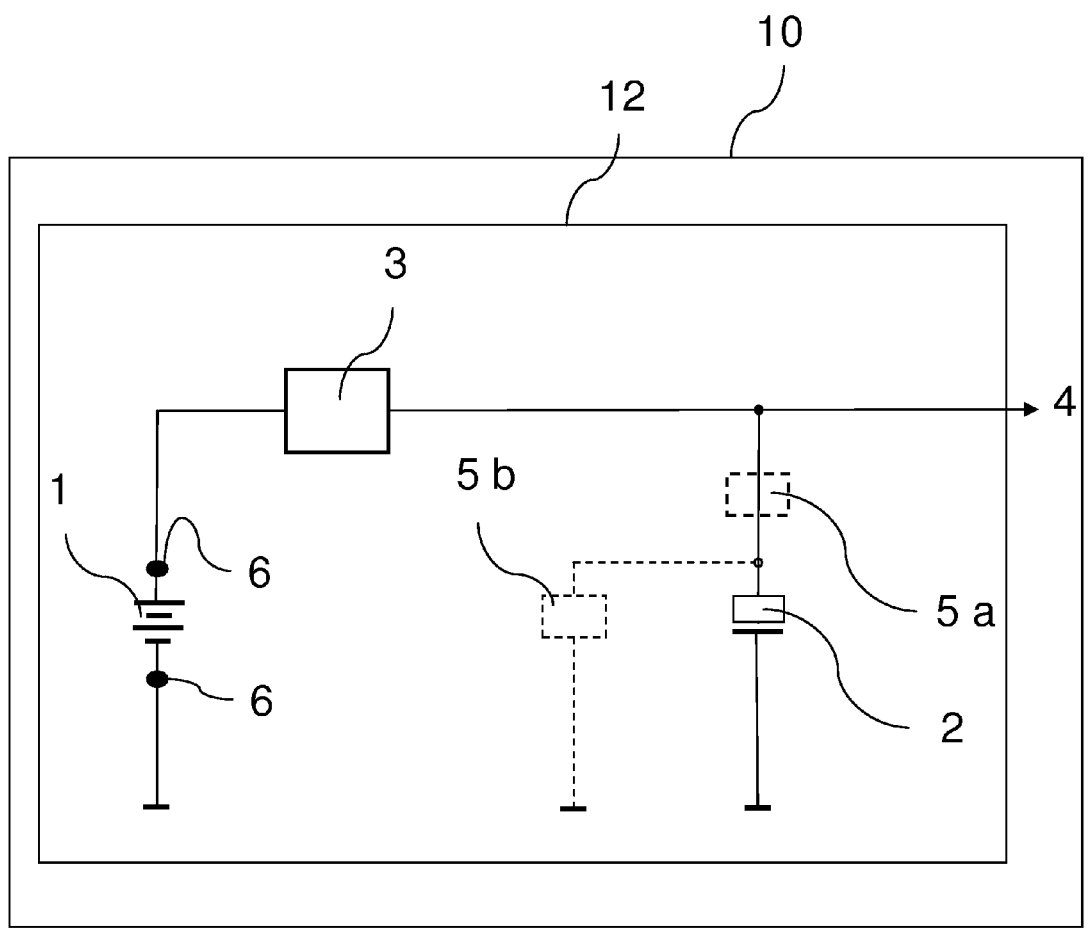
FIG. 1 shows a general circuit arrangement with a first energy source and a charging apparatus for a high-capacity storage element.

With reference first to FIG. 1, an embodiment of the invention is a supply apparatus for supplying a liquid substance, which is generally indicated by symbol 10. The supply apparatus 10, such as, for example, a medical appliance for detection of at least one physiological characteristic value or an insulin pump worn outside the body and for providing a metered supply of a liquid medicament, is equipped with a first replaceable energy source 1 which is connected via battery contacts 6. In particular, the supply apparatus 10 has a compartment for holding the first replaceable energy source 1, for example a battery, a rechargeable battery or a fuel cell, which has a restricted life and must be replaced after a certain operating time. Primary cells such as these are produced in a charged form, and are generally provided as throwaway articles which are discharged only once. The electrical energy stored in the batteries is stored indirectly as a chemical compound and is released during the discharge process by Faraday oxidation and by reduction of electrochemically active materials. Supply gaps can occur when, for example, the battery is replaced at the end of its life or if short-term interruptions, caused by inertia forces, affect the contact springs.

To address such supply gap problems, the supply apparatus 10 has an uninterruptible power supply 12 according to the present invention which not only allows the primary cell or battery, i.e. first replaceable energy source 1, to be replaced without interrupting the medicament (e.g. insulin) supply, but can also bridge uncontrolled short-term interruptions in the current supply or voltage supply resulting from bouncing of the battery contacts 6, and which can also provide an adequate emergency power reserve.

In one embodiment, the first energy source 1 for supplying electrical energy may be a conventional primary cell, such as alkaline, lithium or other batteries that are known to those skilled in the art. However, in other embodiments, secondary cells can also be used, which are charged in a charging apparatus and can be accommodated, analogously to a primary cell, in the accommodation compartment of the medical appliance or the pump.

The uninterruptible power supply 12 further includes a second energy source 2 for bridging supply gaps from the first energy source 1, and a charging appliance 3 which is fed from the first energy source 1 and ensures that the second energy source 2 has an adequate state of charge.

The second energy source 2 comprises a high-capacity storage element 14 (FIGS. 2 and 3) which ensures an uninterruptible power supply for the medical appliance if the first energy source fails.

In one embodiment the high-capacity storage element 14 is accommodated in the voltage supply and is referred hereinafter by the expression "SuperCap." In principle, the SuperCap 14 comprises an electrochemical double-layer capacitor surrounded by an electrolyte. When in the charged state, ion transport takes place, analogously to capacitor charging, under the influence of the electrical field.

In one particularly preferred embodiment, the SuperCap 14 in the main voltage supply circuit provides the buffering for the entire power supply.

In another embodiment, supply failures of the power supply 14 are directly buffered by the SuperCap 14 by connecting the high-capacitance capacitor in parallel with the first energy source 1.

Figure 2:
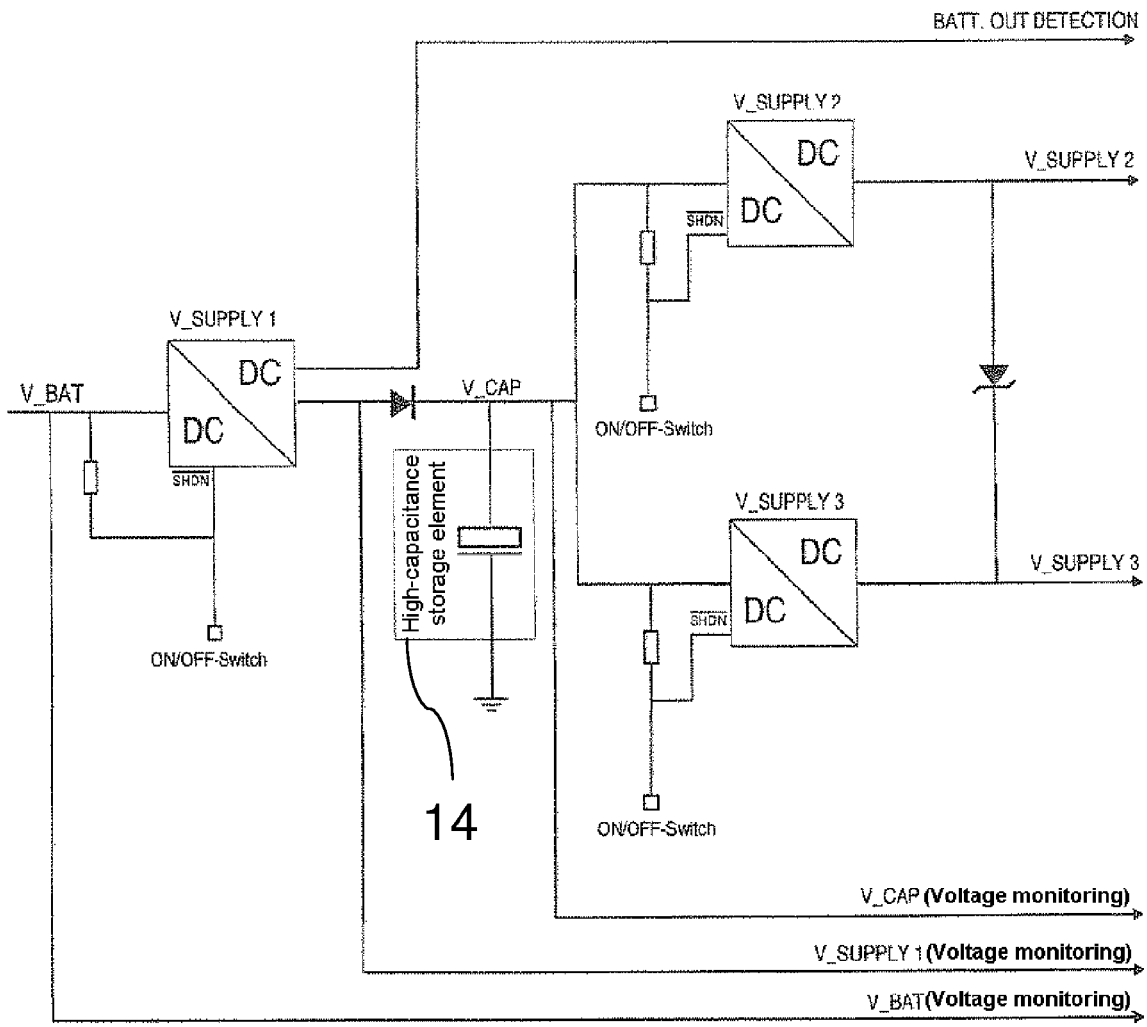
FIG. 2 shows a circuit for a power supply, by means of which a main circuit is buffered by a SuperCap and further voltages are emitted by means of appropriate DC/DC converters.

In another embodiment, two different voltage circuits are provided as shown by FIG. 2, with the main voltage supply circuit V_SUPPLY 1 in this case being buffered by the SuperCap 14. Secondary circuits V_SUPPLY 2 and V_SUPPLY 3 which supply assemblies of secondary importance are not buffered.

A first aspect of the SuperCap 14 relates to the fact that the SuperCap makes it possible to provide components which behave like capacitances but have extraordinarily high storage densities of up to 10,000 W/kg.

A second aspect relates to the SuperCap 14 providing the peak supply. This makes it possible to reduce the space requirement and the dimensions of the power supply for peak loads, and this is associated with a considerable reduction in the power loss from the power supply. In addition, this results in an advantageous reduction in the internal resistance of the power supply.

A third aspect relates to compensation for inductive components of the primary cells by means of the SuperCap 14. Commercially available primary cells exhibit an increase in the inductive components as the state of charge decreases, which can have a negative influence on the response to power supply pulses, particularly at critical cell voltages, and can lead to uncontrolled operating states or voltage fluctuations.

The high-capacity storage element or SuperCap 14 should have a minimum capacitance of about 0.5 Farad and should have housing dimensions which allow it to be integrated in the medical appliance.

A further aspect relates to the emergency power reserve of the supply apparatus 10. For safe operation, it is necessary to know as well as possible when the stored energy will be discharged, in order to provide the user with sufficient time to replace the energy store. The stored rated energy in primary cells can be estimated only approximately because of various influences, such as the storage conditions, temperature range or battery age. However, the so-called emergency power reserve can be determined far more accurately when using a SuperCap solution. Each of the SuperCap embodiments mentioned above is discussed hereafter in greater details.

FIG. 1 schematically illustrates a circuit arrangement for the uninterruptible power supply 12. The second energy source 2 (e.g., the high-capacity element or SuperCap 14) is supplied with voltage via a charging apparatus 3 from a primary cell, i.e. first replaceable energy source 1. The load element, for example an insulin pump which draws heavy current, is represented schematically by symbol 4 as a load on the voltage supply line. The charging apparatus 3 may, in one simple embodiment, be in the form of a forward-biased diode or a DC/DC converter which transforms the battery voltage to a voltage level which corresponds not only to the optimum operating point for maintenance of the second energy source 2 (e.g., SuperCap 14) but also to the required operating voltage for the appliance. The state of charge of the high-capacity storage element can be monitored by means of a charge monitoring device.

For example, a simple state of charge monitor can be formed by means of an apparatus 5a which measures the charge taken from the second energy source 2 and adds it up by means of an integrator. The state of charge can be determined to a good approximation by means of a state of charge measurement, carried out by means of the voltage measurement during no-load operation (which is introduced briefly for this purpose) and by means of the elements 5a and 5b or by loading with a defined resistive load, since the second energy source 2 has a discharge curve like a capacitor element.

FIG. 2 shows a circuit design for an appliance feed according to the invention by means of which a commercially available primary cell, for example a 1.5 V alkaline or a 1.2 V NiMH cell at the input V_BAT. After conversion of the battery voltage by means of a voltage converter V_Supply 1 to an intermediate operating voltage V_Supply 1, the state of charge of the SuperCap is maintained continuously via a diode and a feed supply for the voltage converters (V_Supply2, V_Supply3). The object of both of these is to provide voltage potentials for supplying various functional groups at the outputs of the voltage supply. Further output signals are provided for monitoring the voltage potentials, and are used for patient alarm purposes. When the primary battery is replaced, the voltage V_BAT fails. The Schottky diode between the voltage outputs V_Supply 2 and V_Supply 3 and is required if the voltage converter V_Supply 3 fails. In this case, voltage is supplied via the supply path V_Supply 2.

Figure 3:
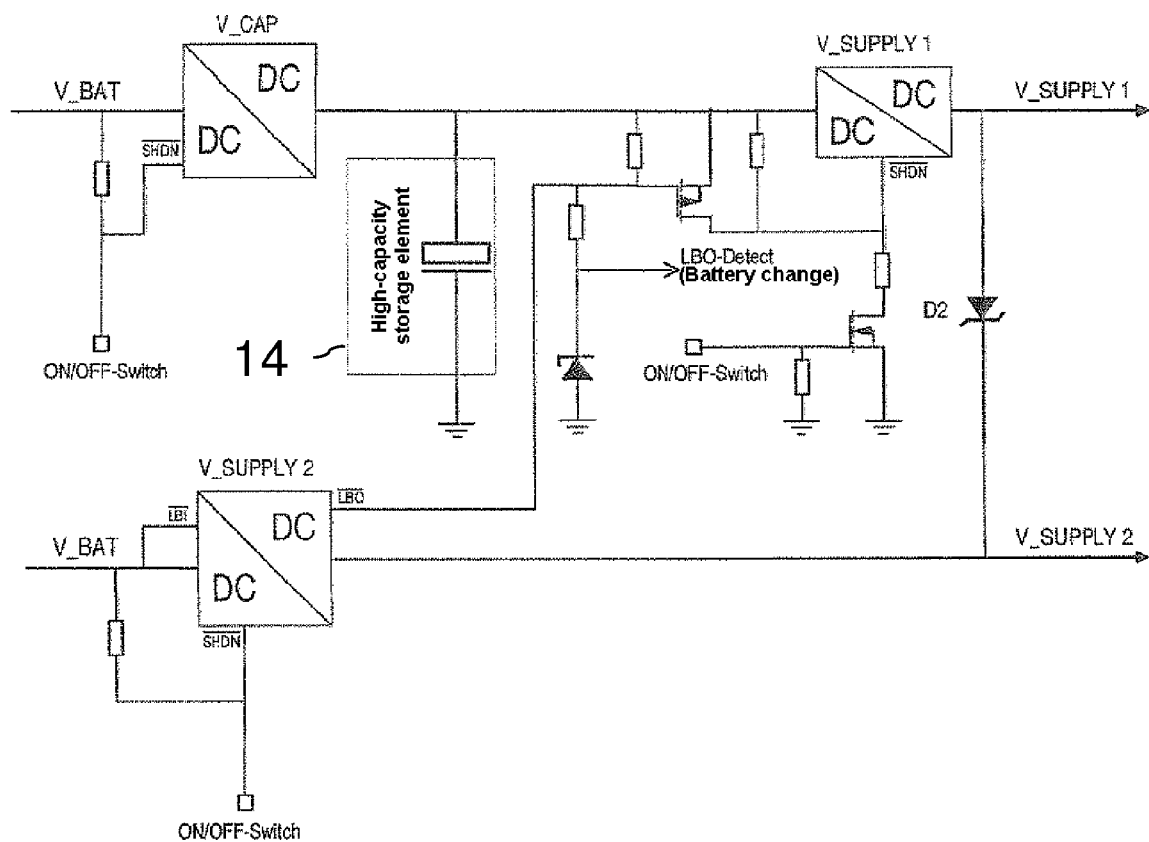
FIG. 3 shows a circuit for a power supply for providing an uninterruptible appliance supply and a non-uninterruptible appliance supply.

FIG. 3 shows a power supply circuit which is used for buffering a main circuit by means of a SuperCap 14 and to produce different required voltages by means of appropriate downstream DC/DC converters. Thus, the power supply circuit provides an uninterruptible appliance supply (V_SUPPLY_1) and a non-uninterruptible appliance supply (V_SUPPLY_2).

Figure 4:
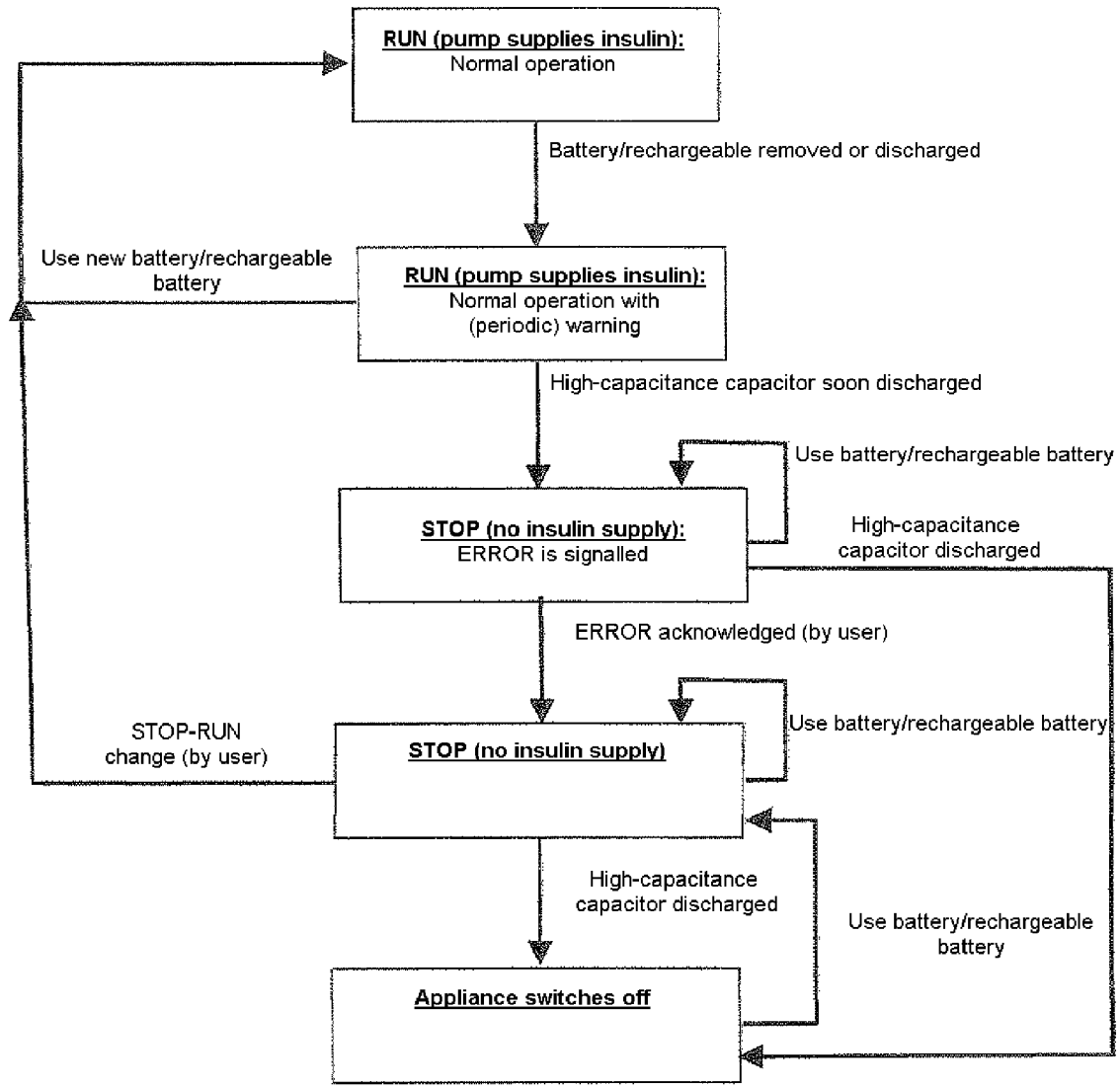
FIG. 4 shows a flowchart of an infusion apparatus which is equipped with an uninterruptible power supply and allows the first energy source to be replaced without interrupting the operation of the insulin supply.

FIG. 4 shows a flowchart of the individual procedure steps for an insulin pump with an uninterruptible power supply, from the normal operating state with the energy sources charged to the state in which all of the energy sources are completely discharged. During normal operation (RUN), a serviceable power supply is provided by the first energy source. If the battery or the rechargeable battery is removed from the battery compartment or if its state of charge is inadequate, the insulin supply is provided with the assistance of the SuperCap emergency reserves. A periodic warning is emitted to the user, requesting him to change the battery soon. If the necessary battery change is delayed until the SuperCap is approaching an incipient discharged state, the supply apparatus is first of all stopped, and the insulin supply ceases ("stop, no insulin supply, error is signalled"). If the SuperCap is discharged completely ("SuperCap discharged"), the appliance switches itself off automatically, and cannot be reset to normal operation until the first energy source has been replaced, and in fact only once the SuperCap is in the charged state again and after manual activation by the operator ("STOP-RUN change").

By the above embodiments, the replacement of the energy source without interrupting the insulin supply contributes to a more convenient, more discrete and easier handling apparatus, which leads to higher patient confidence, as scarcely any control errors can occur if the infusion appliance is of a simple design and can be operated easily.

What is claimed is:

1. A medical appliance comprising:
   a power supply comprising:
      a first replaceable energy source for supplying electrical energy,
      a second energy source for bridging supply gaps from the first energy source, and
      a charging appliance which is fed from the first energy source and ensures that the second energy source has an adequate state of charge,
      wherein the second energy source comprises a high-capacity storage element which ensures an uninterruptible power supply for the medical appliance if the first energy source fails; and
   wherein the medical appliance emits a warning if the first replaceable energy source is removed, ceases a supply of a medicament if the second energy source approaches a discharge state, switches itself off automatically if the second energy source is depleted completely, and cannot be restarted manually until the first energy source is replaced and the second energy source is charged.

2. The medical appliance according to claim 1, wherein the first energy source comprises at least one replaceable primary cell or secondary cell, which is connected via battery contacts.

3. The medical appliance according to claim 1, wherein the high-capacitor storage element is operated via a voltage converter in parallel with the first energy source.

4. The medical appliance according to claim 1, further comprising a non-uninterruptible supply voltage.

5. The medical appliance according to claim 1, wherein the high-capacity storage element is operated in parallel with the first energy source, and compensates for the inductive components of the first energy source.

6. The medical appliance according to claim 1, wherein the medical appliance is an insulin pump worn outside the body and wherein the medicament is insulin.

7. The medical appliance according to claim 1, wherein the medical appliance comprises an apparatus for detection of at least one physiological characteristic value.

8. The medical appliance according to claim 1, wherein the high-capacity storage element has a capacitance of at least 0.5 Farad.

9. The medical appliance according to claim 1, further comprising a measurement device which determines the state of charge of the high-capacity storage element.

10. The medical appliance according to claim 1, further comprising a measurement device which estimates remaining capacity of the high-capacity storage element, and initiates a safe disconnection process if the high-capacity storage element approaches an incipient discharged state.

* * * * *